(12) United States Patent
Ito et al.

(10) Patent No.: US 8,741,172 B2
(45) Date of Patent: Jun. 3, 2014

(54) LITHIUM-TITANIUM COMPLEX OXIDE AND MANUFACTURING METHOD THEREOF, AND BATTERY ELECTRODE USING SAME

(71) Applicant: Taiyo Yuden Co., Ltd., Tokyo (JP)

(72) Inventors: Daigo Ito, Takasaki (JP); Chie Kawamura, Takasaki (JP); Masaki Mochigi, Takasaki (JP); Toshimasa Suzuki, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 249 days.

(21) Appl. No.: 13/688,041

(22) Filed: Nov. 28, 2012

(65) Prior Publication Data
US 2013/0343983 A1     Dec. 26, 2013

(30) Foreign Application Priority Data
Jun. 20, 2012   (JP) .................................. 2012-138435

(51) Int. Cl.
*H01M 4/58*   (2010.01)
*H01M 4/02*   (2006.01)

(52) U.S. Cl.
USPC ................... 252/182.1; 429/231.5; 429/218.1

(58) Field of Classification Search
USPC .......................... 252/182.1; 429/231.5, 218.1
See application file for complete search history.

(56) References Cited

FOREIGN PATENT DOCUMENTS

JP   2001-213623 A1   8/2001
JP   2001-240498 A1   9/2001

*Primary Examiner* — Helen O Conley
(74) *Attorney, Agent, or Firm* — Law Office of Katsuhiro Arai

(57) ABSTRACT

A lithium-titanium complex oxide whose total water generation amount and total carbon dioxide generation amount measured by thermal decomposition GC-MS are preferably 1500 wt ppm or less and 2000 wt ppm or less, respectively, is obtained by subjecting a mixture of titanium compound and lithium compound to a heat treatment at 600° C. or above, cooling the obtained reaction product to 50° C. or below, and then subjecting the cooled reaction product to a reheat treatment involving heating to the maximum temperature of 300 to 700° C. and then cooling, wherein the dew point of the ambience of the reheat treatment is controlled at −30° C. or below at a temperature of 200° C. or above.

5 Claims, 2 Drawing Sheets

Total water generation amount

Total water generation amount

LITHIUM-TITANIUM COMPLEX OXIDE AND MANUFACTURING METHOD THEREOF, AND BATTERY ELECTRODE USING SAME

BACKGROUND

1. Field of the Invention

The present invention relates to a lithium-titanium complex oxide suitable as an electrode material for lithium ion secondary battery, as well as a manufacturing method thereof.

2. Description of the Related Art

Development of lithium ion secondary batteries as high-capacity energy devices has been active in recent years, and lithium ion secondary batteries are beginning to be utilized in consumer equipment, industrial machinery, automobiles and various other fields. Characteristics required of lithium ion secondary batteries include high energy density, high power density and other characteristics that support high capacity and allow for quick charge/discharge. On the other hand, incidents of fire involving a lithium ion secondary battery have been reported and the market is demanding greater safety of lithium ion secondary batteries. In particular, lithium ion secondary batteries used in onboard applications, medical applications, etc., directly affect human life in case of accidents and require even greater safety. Safety is also required of materials used for lithium ion secondary batteries, where, specifically, the market is demanding materials that demonstrate stable charge/discharge behaviors and will not burst or ignite even in unforeseen accidents.

Lithium titanates are expressed by, for example, $Li_4Ti_5O_{12}$, $Li_{4/3}Ti_{5/3}O_4$ or $Li[Li_{1/6}Ti_{5/6}]_2O_4$, and have a spinel crystalline structure. The aforementioned lithium titanate changes to a rock-salt crystalline structure as lithium ions are inserted during charge, and changes back to a spinel crystalline structure again as lithium ions dissociate. The lithium titanate undergoes far less change in its lattice volume due to charge/discharge compared to carbon materials that are conventional materials for negative electrodes, and generates little heat even when shorted to the positive electrode, thereby preventing fire accidents and ensuring high safety. Lithium-titanium complex oxides whose main constituent is lithium titanate and to which trace constituents have been added as necessary, are beginning to be adopted by lithium ion secondary battery products that are designed with specific focus on safety.

Patent Literature 1 discloses the ambience control method in the sintering step. According to the method described, synthesis reaction is implemented in the sintering step and preliminary sintering step before the sintering step under a flow of nitrogen gas of lower partial oxygen pressure. The purpose of this is to suppress lithium volatilization loss during heat treatment. Patent Literature 2 discloses sintering in an inert gas flow based on low partial oxygen gas pressure. The purpose of this is to obtain a powder of high crystallinity. Both literatures do not provide details of ambience control and only mention that the ambience in question is a sintering ambience.

BACKGROUND ART LITERATURES

[Patent Literature 1] Japanese Patent Laid-open No. 2001-213623

[Patent Literature 2] Japanese Patent Laid-open No. 2001-240498

SUMMARY

As described above, lithium titanates offer inherently high safety and stability due to their principle constitution, but present concerns over drop in stability due to impurities, etc., in the material or manufacturing process. One such concern is adsorption of gas components in atmosphere. If a lithium titanate powder adsorbs various gases, reaction with an electrolyte solution or an unexpected electrode reaction may occur while the lithium-ion secondary battery is charging/discharging or left stationary. Also, achievement of stable dispersion in the dispersion medium may become difficult when an electrode coating solution is prepared. To enhance the operation stability in the lithium-ion secondary battery or dispersion stability of the electrode coating solution, it is preferable to eliminate adsorption of gases as it is a cause of drop in stability.

In general, lithium titanates are likely to adsorb gases on their powder surface. Gases that affect the aforementioned characteristics include moisture and carbon dioxide gases. These gases are adsorbed to the lithium titanate during the manufacturing process from blending of materials to packaging of product, so suppressing adsorption in the manufacturing process is important. One simple way to prevent adsorption of gases is to control the ambience. Manufacturing should be carried out in an ambience free from those gases that are not to be adsorbed. However, controlling the ambience in the entire process is not desirable as it increases the manufacturing cost and process load. The inventions described in Patent Literature 1 and Patent Literature 2 represent examples of manufacturing methods where a part of the manufacturing process is ambience-controlled. However, neither of them is intended to prevent adsorption of gases, and both literatures do not provide details of ambience control and only mention that the ambience in question is a sintering ambience. As explained, no clear manufacturing method has been made available to prevent adsorption of gases or obtain a lithium titanate powder that does not easily adsorb gases.

In general, the higher the value of specific surface area of a powder, greater the Li/Ti composition ratio, and more abundant the trace constituents such as alkali metals, the greater the amount of adsorbed gas becomes. From the viewpoint of battery characteristics, on the other hand, in general, the higher the value of the specific surface area, the better the rate characteristics become. Therefore, it is preferable to improve the value of specific surface area while suppressing gas adsorption. In view of the above, the object of the present invention is to provide a lithium titanate ensuring minimum absorption of gases and high safety, as well as a method of manufacturing such lithium titanate.

Any discussion of problems and solutions involved in the related art has been included in this disclosure solely for the purposes of providing a context for the present invention, and should not be taken as an admission that any or all of the discussion were known at the time the invention was made.

After studying in earnest, the inventors of the present invention found that, if a lithium titanate is manufactured under certain heat treatment conditions, adsorption to the powder of those gases that would affect the various characteristics such as battery characteristics could be suppressed and that a lithium titanate powder could be manufactured that would not easily adsorb these gases even if exposed thereto, and they consequently completed the present invention.

According to the method of manufacturing lithium-titanium complex oxide proposed by the present invention, a mixture of titanium compound and lithium compound is subjected to a heat treatment reaction at 600° C. or above and the obtained reaction product is cooled to 50° C. or below, after which the cooled reaction product is subjected to reheat treatment involving heating to a maximum temperature of 300 to 700° C. and then cooling. In this reheat treatment, the dew point of the ambience is controlled at −30° C. or below at temperatures of 200° C. or above.

The lithium-titanium complex oxide obtained by this manufacturing method has a total amount of water generation of preferably 1500 wtppm or less, and total amount of carbon dioxide generation of preferably 2000 wtppm or less, as measured by thermal decomposition gas chromatography mass spectrometry by heating from 60° C. to 900° C. at a rate of 20° C./min.

According to the present invention, a battery electrode using the aforementioned lithium-titanium complex oxide, and a lithium-ion secondary battery having such electrode, are provided.

According to the present invention, a lithium-titanium complex oxide can be obtained that adsorbs less gas and is associated with a smaller increase in the amount of solvent needed to prepare a coating solution even with a larger specific surface area, which contributes to higher safety of a lithium-ion secondary battery whose particles are made finer to achieve better electrical characteristics.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

Figure 1:
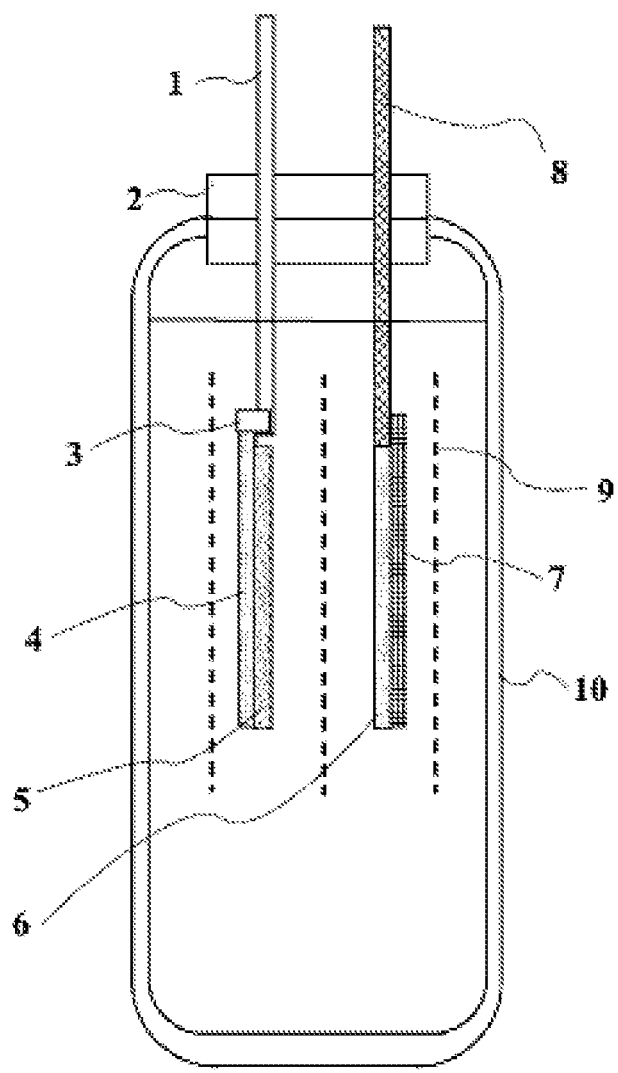
FIG. 1 is a schematic section view of a half cell.

| Description of the Symbols | |
|---|---|
| 1, 8 | Al lead |
| 2 | Thermo-compression bonding tape |
| 3 | Kapton tape |
| 4 | Aluminum foil |
| 5, 15, 16 | Electrode mixture |
| 6 | Metal Li plate |
| 7 | Ni mesh |
| 9 | Separator |
| 10 | Aluminum laminate cell |

DETAILED DESCRIPTION OF EMBODIMENTS

According to the present invention, a ceramic material whose main constituent is a lithium titanate having a spinel structure expressed by $Li_4Ti_5O_{12}$ and to which trace constituents have been added as necessary is provided, and this ceramic material contains the aforementioned lithium titanate typically by 90% or more, or preferably 95% or more. In this Specification, this ceramic material is sometimes referred to as "lithium-titanium complex oxide." According to the present invention, the lithium-titanium complex oxide can contain elements other than titanium, lithium and oxygen, where examples of the elements that can be contained include potassium, phosphorous, niobium, sulfur, silicon, zirconium, calcium and sodium, etc. Preferably these constituents are substantially all dissolved in the ceramic structure of lithium titanate as oxides.

A lithium-titanium complex oxide conforming to the present invention is generally manufactured through a step to uniformly mix the materials, a step to heat-treat the obtained mixture, a step to crush the lithium-titanium complex oxide obtained through the heat treatment if it is coarse, and second or subsequent heat treatment steps.

In the present invention, lithium-titanium complex oxide is typically obtained by mixing and sintering a titanium compound, lithium compound, and trace constituents, as necessary.

For the lithium source, a lithium salt or lithium hydroxide is typically used. Examples of the lithium salt include a carbonate and acetate, etc. The hydroxide may be a hydrate such as monohydrate, or the like. For the source lithium, two or more of the foregoing may be combined. As other lithium materials, lithium compounds that are generally readily available can be used as deemed appropriate. If residues of substances originating from the lithium compound cannot be permitted in the heat treatment process, it is safe to avoid lithium compounds containing elements other than C, H and O. For the source titanium, a titanium dioxide or hydrous titanium oxide can be applied. A lithium compound is mixed with a titanium compound by the wet method or dry method so that the mol ratio of Li and Ti preferably becomes 4:5. It should be noted that, since lithium may decrease as a result of partial volatilization, loss due to sticking to equipment walls, or for other reasons in the manufacturing process, a greater amount of source lithium than the final target amount of Li may be used.

Wet mixing is a method whereby a dispersion medium such as water, ethanol, or the like is used together with a ball mill, planetary ball mill, bead mill, wet jet mill, etc. Dry mixing is a method whereby without a dispersion medium, a ball mill, planetary ball mill, bead mill, jet mill or flow-type mixer, or machines capable of applying compressive force or shearing force to achieve precision mixing or efficiently add mechano-chemical effect such as Nobilta (Hosokawa Micron) or Miralo (Nara Machinery) or the like is used.

The mixed materials are heat-treated in atmosphere, dry air, nitrogen, argon or other atmosphere at 600° C. or above, or preferably at 750 to 950° C., to obtain a lithium-titanium complex oxide. The specific heat treatment temperature changes as deemed appropriate according to the particle sizes and mixing level of materials, as well as the target particle size of the lithium-titanium complex oxide. The reaction product obtained through the first heat treatment is cooled to 50° C. or below.

Preferably the product obtained through the heat treatment is subjected to at least one crushing step among various known steps such as ball milling, grinding process, jet milling, and pin milling. Ball milling involves 1 to 10 hours of crushing, for example, while grinding process involves 1 to 50 hours, or preferably 5 to 50 hours, of crushing, for example. Classification may be performed thereafter, if necessary. One example of classification is a process based on a dry classifier that uses a classification rotor.

According to the present invention, the reaction product obtained by the first heat treatment is cooled and crushed and then subjected to at least one round of heat treatment. The number of heat treatments after the first heat treatment should be at least 1, and the final heat treatment involving heating to 300° C. or above is called the reheat treatment. According to the present invention, the maximum temperature of reheat treatment is 300 to 700° C., and in the temperature range of 200° C. or below during reheat treatment, the dew point of ambience is controlled at −30° C. or below, or preferably −70° C. or below. The lower limit of the aforementioned dew point is not specifically defined, and may be −100° C. or so to facilitate preparation. Traditionally the dew point of heating ambience is around 0° C. or above when ceramic materials such as lithium-titanium complex oxides and the like are manufactured. For example, Patent Literature 2 mentioned above involves "dry heat treatment," but in "dry heat treatment" implemented in this field of science, normally the dew point is 10° C. or so. Also, Patent Literature 1 describes sintering in an "inert gas ambience of 0.1 Pa or less in partial oxygen gas pressure," but normally when this type of material is manufactured, the dew point is approximately 5 to 15° C. at temperatures of approximately 400 to 600° C. during cooling after heat treatment. To be more specific, manufacturing of this type of material generally involves sintering in a continuous sintering furnace such as a pusher kiln or roller hearth kiln capable of manufacturing a large quantity, in order to lower the manufacturing cost. One method often employed to enhance productivity or increase quality is to minimize the cooling sections over the entire furnace length and thereby increase the percentage of sections where the maximum temperature is kept. This is to improve the manufacturing throughput or shorten the entire length of the sintering furnace to reduce the initial cost and installation area. In this powder manufacturing method, the powder and container transported to the outside of the furnace are not sufficiently cooled and remain exposed to atmosphere at temperatures of approximately 400° C. at the lowest to approximately 600° C. at the highest. The dew point of the atmosphere to which this powder is exposed is generally 5 to 15° C., although the specific dew point varies depending on season, weather, air-conditioning in the building, etc.

Methods to lower the dew point of reheat treatment to −30° C. or below include, for example, performing sintering under a flow of gas in a highly airtight sintering furnace whose interior dew point is controlled at −100° C. or below, or using equipment that allows the powder to be cooled to normal temperature as it comes out of the exit of the continuous furnace without letting it be exposed to the atmosphere. In addition, other methods include, for example, performing sintering by means of saggar transport using a roller hearth kiln or pusher kiln, where the return conveyor is covered with a case and filled with a gas whose dew point is −100° C. or below, or performing sintering without using a rotary kiln or other saggar, but by using a rotary cooler, etc., by allowing a gas whose dew point is −100° C. or below to flow through the cooler, as well as in the kiln.

According to a new insight gained by the inventors, presence of carbon dioxide, which is considered, along with water, as a factor of deterioration of characteristics in reheat treatment, is permitted. The most important aspect of reheat treatment is to eliminate water. Eliminating water is important because, if heat treatment is performed in an ambience where moisture is present, hydroxyl groups are formed on the particle surface, etc., of lithium-titanium complex oxide, and these hydroxyl groups act as sites where water and carbon dioxide are adsorbed.

According to the inventors, causing water to act upon the reaction system at high temperature where the reaction becomes active, is known to introduce hydroxyl groups to the particle surface, etc., which has been confirmed by detection through thermal desorption spectroscopy (TDS), for example. A lithium-titanium complex oxide having various amounts of hydroxyl groups formed on it was kept at 80° C. for 48 hours in a sealed container of saturated steam ambience of 99% or above in $CO_2$ concentration and 80° C. in temperature, cooled to room temperature in a sealed condition, and then removed and kept in atmosphere at room temperature for 24 hours, and after this adsorption treatment, water and carbon dioxide were quantified by thermal decomposition GC-MS measurement, the result of which found that lithium-titanium complex oxide with more hydroxyl groups tended to show higher quantities of both water and more carbon dioxide.

This suggests that, if the total water generation amount calculated by GC-MS measurement exceeds 1500 ppm based on weight, the amounts of water and $CO_2$ adsorbed by the above adsorption treatment increase significantly, where greater amounts of adsorbed water and $CO_2$ have been confirmed in atmosphere following a continuous exposure of such powder in atmosphere. If the total water generation amount calculated by GC-MS measurement is 1500 ppm or less, on the other hand, amounts of water and $CO_2$ adsorbed have been confirmed low, regardless of whether the above adsorption treatment is used or the powder is exposed to atmosphere. The smaller the amount of water generation calculated by GC-MS measurement, the better, and although the lower limit is not specifically defined, it may be 500 ppm, for example, based on weight, to ensure greater availability of powder and the like. Here, GC-MS measurement is performed by raising the temperature from 60° C. to 900° C. at a rate of 20° C./min, the details of which are explained in the "Examples" section.

In addition, if the total amount of $CO_2$ generation calculated by GC-MS measurement exceeds 2000 ppm based on weight, dispersion stability is negatively affected and stable dispersion becomes difficult to achieve when preparing an electrode coating solution, while the required amounts of dispersion medium and binder increase and often the electrode coating solution does not offer uniform coating thickness. Also, when a lithium-ion secondary battery is formed, presence of gas components that deteriorate due to reaction with an electrolyte or an unexpected electrode reaction prevents formation of a lithium-ion secondary battery offering improved long-term stability and safety. If, on the other hand, the total amount of $CO_2$ generation calculated by GC-MS measurement is 2000 ppm or less, or preferably 1500 ppm or less, based on weight, dispersion stability is not compromised and stable dispersion can be achieved easily when preparing an electrode coating solution, and the electrode coating solution often offers uniform coating thickness without having to use more dispersion medium or binder. Also when a lithium-ion secondary battery is formed, absence of gas components that deteriorate due to reaction with an electrolyte or an unexpected electrode reaction allows for formation of a lithium-ion secondary battery offering improved long-term stability and safety. The smaller the total amount of $CO_2$ generation calculated by GC-MS measurement, the better, and although the lower limit is not specifically defined, it may be 500 ppm, for example, based on weight, to ensure greater availability of powder and the like.

As mentioned above, while amounts of gas adsorption vary depending on the Li/Ti composition ratio and amounts of trace constituents such as alkali metals, in addition to the value of specific surface area, the amounts change only according to the value of specific surface area if the Li/Ti composition ratio and amounts of trace constituents are constant. It can be said that the value obtained by dividing the amount of gas generation by the value of specific surface area represents adsorption characteristics reflecting the physical properties and chemical properties of the applicable substance not dependent upon the value of specific surface area. In other words, the lower the value of such adsorption characteristics, the less likely the powder is to naturally adsorb gas. Based on past studies, a powder obtained by a manufacturing method where this value of adsorption characteristics is kept to 200 or less regardless of the value of specific surface area has been confirmed to offer good coating solution dispersion stability and good cycle characteristics, and to adsorb less gas when exposed to atmosphere. If the value of specific surface area is relatively small, a higher value of adsorption characteristics is accommodated. If the value of specific surface area is high, or specifically as high as 10 $m^2/g$ or so, on the other hand, preferably this value of adsorption characteristics is kept to 150 or less.

The aforementioned powder treatment method is only an example and those skilled in the art should be able to name other specific treatment methods, as appropriate, for obtaining a lithium-titanium complex oxide having a desired particle size distribution, by referring to the foregoing and examples described below, and lithium-titanium complex oxides obtained by these other means are also included in the scope of the present invention.

The lithium-titanium complex oxide obtained by the present invention can be used favorably as an active electrode material for lithium ion secondary batteries. It can be used for positive electrodes or negative electrodes. The configurations and manufacturing methods of electrodes containing the lithium-titanium complex oxide as their active material and a lithium ion secondary battery having such electrodes can apply any prior technology as deemed appropriate. Also in the examples explained later, an example of manufacturing a lithium ion secondary battery is presented. Typically a suspension containing the lithium-titanium complex oxide as an active material, conductive auxiliary, binder, and appropriate solvent is prepared and this suspension is applied to the metal piece, etc., and dried, and then pressed to form an electrode.

For the conductive auxiliary, metal powder such as carbon material, aluminum powder or the like, or conductive ceramics such as TiO or the like can be used. Examples of the carbon material include acetylene black, carbon black, coke, carbon fiber, and graphite.

Examples of the binder include various resins, or specifically fluororesins, etc, for example, polytetrafluoroethylene (PTFE), polyvinylidene difluoride (PVdF), fluororubber, styrene butadiene rubber, and the like.

Preferably the blending ratio of negative electrode active material, conductive agent, and binder is 80 to 98 percent by mass of negative electrode active material, 0 to 20 percent by mass of conductive agent, and 2 to 7 percent by mass of binder.

The collector is preferably an aluminum foil or aluminum alloy foil of 20 mm or less in thickness.

When the lithium-titanium complex oxide is used as a negative electrode active material, the material used for the positive electrode is not specifically limited, and any known material can be used, where examples include lithium-manganese complex oxide, lithium-nickel complex oxide, lithium-cobalt complex oxide, lithium-nickel-cobalt complex oxide, lithium-manganese-nickel complex oxide, spinel lithium-manganese-nickel complex oxide, lithium-manganese-cobalt complex oxide, and lithium iron phosphate, etc.

For the conductive agent, binder, and collector for the positive electrode, those mentioned above can be used. Preferably the blending ratio of positive electrode active material, conductive agent, and binder is 80 to 95 percent by mass of positive electrode active material, 3 to 20 percent by mass of conductive agent, and 2 to 7 percent by mass of binder.

From the positive/negative electrodes thus obtained, electrolyte solution constituted by lithium salt and organic solvent or organic solid electrolyte or inorganic solid electrolyte, separator, etc., a lithium ion secondary battery can be constituted.

Examples of the lithium salt include lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluorometanesulfonate ($LiCF_3SO_3$), lithium bistrifluoromethyl sulfonyl imide [$LiN(CF_3SO_2)_2$], and the like. One type of lithium salt may be used, or two or more types may be combined. Examples of the organic solvent include propylene carbonate (PC), ethylene carbonate (EC), vinylene carbonate and other cyclic carbonates; diethyl carbonate (DEC), dimethyl carbonate (DMC), methyl ethyl carbonate (MEC) and other chained carbonates; tetrahydrofuran (THF), 2-methyl tetrahydrofuran (2MeTHF), dioxolane (DOX) and other cyclic ethers; dimethoxy ethane (DME), dietoethan (DEE) and other chained ethers; γ-butyrolactone (GBL); acetonitrile (AN); and sulfolane (SL), etc., either used alone or combined into a mixed solvent.

For the organic solid electrolyte, for example, polyethylene derivative, polyethylene oxide derivative or polymer compound containing it, or polypropylene oxide derivative or polymer compound containing it, is suitable. Among the inorganic solid electrolytes, Li nitride, halogenated Li, and Li oxyate are well-known. In particular, $Li_4SiO_4$, $Li_4SiO_4$—LiI—LiOH, $xLi_3PO_4$-(1-x) $Li_4SiO_4$, $Li_2SiS_3$, $Li_3PO_4$—$Li_2S$—$SiS_2$, phosphorus sulfide compound, etc., are effective.

For the separator, a polyethylene microporous membrane is used. The separator is installed between the two electrodes in a manner not allowing the positive electrode and negative electrode to contact each other.

EXAMPLE

The present invention is explained more specifically using examples below. It should be noted, however, that the present invention is not limited to the embodiments described in these examples. First, how the samples obtained by the examples/comparative examples were analyzed and evaluated is explained.

(Thermal Decomposition GC-MS Measurement)

Details of thermal decomposition GC-MS measurement are explained below. The double-shot pyrolyzer PY2020iD by Frontier Laboratories was used as a thermal decomposition system, 6890-series gas chromatograph by Agilent Technologies was used as a GC system, and Auto Mass JMS-AMII150 by JEOL was used as a MS system. Other measurement conditions are specified below.

Sample heating temperatures: Heated from 60° C. to 900° C. at a rate of 20° C./min.

Carrier gas: He, split ratio of approx. 1/10

Column: Inner diameter 0.25 mm, length 8.7 m (empty column)

GC oven temperature: 250° C./Inlet temperature: 300° C./Detector: MS Before measuring each sample, 0.1 mg of calcium oxalate monohydrate ($CaC_2O_4.H_2O$) was measured as a reference. Calcium oxalate monohydrate was thermally decomposed in the following three steps, through which $H_2O$ and $CO_2$ of equal mols to the amount of calcium oxalate monohydrate used for measurement:

$$CaC_2O_4 \cdot H_2O \rightarrow CAC_2O_4 + H_2O\uparrow \quad (1)$$

$$CaC_2O_4 \rightarrow CaC_2O_3 + CO\uparrow \quad (2)$$

$$CaC_2O_3 \rightarrow CaO + CO_2\uparrow \quad (3)$$

Based on the peak areas at 60° C. to 900° C. of m/z 18 (water) and m/z 44 ($CO_2$) obtained through reference measurements, peak areas in the same range obtained through subsequent sample measurement (3 mg) were converted to weights. Each sample was measured three times and the average was quantified (percent by mass). With both references and samples, measurement was started after the reference/sample was introduced to the system and kept there for 3 minutes under a flow of helium gas.

(Specific Surface Area)

The specific surface area was measured by the BET (Brunauer-Emmett-Teller) method using the FlowSorb II-2300 by Shimadzu.

(Adsorptivity Evaluation)

The reheat-treated powder of lithium titanate complex oxide was placed in a sealed container of saturated steam ambience of 99% or above in $CO_2$ concentration and 80° C. in temperature, kept there at 80° C. for 48 hours, and then cooled to room temperature in a sealed condition, after which the sample was taken out and left in atmosphere at room temperature for 24 hours for gas adsorption treatment. Following this, GC-MS measurement and specific surface area measurement were performed in the same manners as explained above.

(Battery Evaluation—Half Cell)

FIG. 1 is a schematic section view of a half cell. An electrode mixture was prepared by using lithium-titanium complex oxide as an active material. Ninety parts by weight of the obtained lithium-titanium complex oxide as an active material, 5 parts by weight of acetylene black as a conductive auxiliary, and 5 parts by weight of polyvinylidene difluoride (PVdF) as a binder, were mixed using n-methyl-2-pyrrolidone (NMP) as a solvent. The materials were mixed using a high-shear mixer until a stable viscosity was obtained. The amount of NMP was adjusted so the viscosity of the mixed coating solution fell under a range of 500 to 1000 mPa·sec at 100 $s^{-1}$, and the amount of NMP at that time was recorded. This electrode mixture 5 was applied to an aluminum foil 4 to a coating weight of 3 mg/cm² using the doctor blade method. The coated foil was vacuum-dried at 130° C., and then roll-pressed. An area of 10 cm² was stamped out from the coating film to obtain a positive electrode. For the negative electrode, a metal Li plate 6 attached to a Ni mesh 7 was used. For the electrolyte solution, ethylene carbonate and diethyl carbonate were mixed at a volume ratio of 1:2, and then 1 mol/L of $LiPF_6$ was dissolved into the obtained solvent. For a separator 9, a porous cellulose membrane was used. Also, as illustrated, Al leads 1, 8 were fixed using a thermo-compression bonding tape 2, and the Al lead 1 was fixed to the working electrode using a Kapton tape 3. An aluminum laminate cell 10 was thus prepared.

Example 1

Into a 5-L pot, 728 g of a highly pure Anatase-type titanium dioxide (Ishihara Sangyo) and 272 g of a reagent-grade lithium carbonate (Kanto Kagaku), were introduced and sealed together with 7 kg of zirconium beads of 10 mm in diameter, after which the mixture was agitated for 24 hours at 100 rpm and then separated from the beads to obtain a mixed powder. The mixed powder was filled in a saggar and heat-treated in a continuous sintering furnace in atmosphere under a profile of maintaining the maximum temperature of 850° C. for 5 hours. This heat-treated powder was cooled to room temperature and then crushed in a ball mill for 5 hours, after which the crushed powder was reheat-treated in a continuous sintering furnace under a profile of maintaining the maximum temperature of 600° C. for 3 hours. During the reheat treatment, dry air with a dew point of −70° C. was passed through the furnace after the maximum temperature was reached, and outside the furnace until the powder temperature dropped to room temperature, with the powder continuously exposed to dry air. A lithium titanium complex oxide powder was obtained this way.

Example 2

A lithium-titanium complex oxide powder was obtained in the same manner as explained in Example 1, except that the dew point of the reheat treatment ambience was changed to −30° C.

Example 3

A lithium-titanium complex oxide powder was obtained in the same manner as explained in Example 1, except that the heat-treated powder was crushed in a ball mill for 1 hour.

Example 4

A lithium-titanium complex oxide powder was obtained in the same manner as explained in Example 3, except that the dew point of the reheat treatment ambience was changed to −30° C.

Comparative Example 1

A lithium-titanium complex oxide powder was obtained in the same manner as explained in Example 1, except that reheat treatment was performed in atmosphere (dew point of approximately 10° C.).

Comparative Example 2

A lithium-titanium complex oxide powder was obtained in the same manner as explained in Example 1, except that the reheat treatment ambience was controlled only inside the furnace and the powder was transported out of the furnace at high temperature (approximately 500° C.) and exposed to atmosphere (dew point of approximately 10° C.) until it cooled to room temperature.

Comparative Example 3

A lithium-titanium complex oxide powder was obtained in the same manner as explained in Example 3, except that reheat treatment was performed in atmosphere (dew point of approximately 10° C.).

Comparative Example 4

A lithium-titanium complex oxide powder was obtained in the same manner as explained in Example 3, except that the reheat treatment ambience was controlled only inside the furnace and the powder was transported out of the furnace at high temperature (approximately 500° C.) and exposed to atmosphere (dew point of approximately 10° C.) until it cooled to room temperature.

Table 1 summarizes the evaluation results of powders obtained through the examples and comparative examples. Table 2 summarizes the evaluation results, with respect to the examples and comparative examples, after the gas adsorption treatment specified in the "Adsorptivity Evaluation" section above. Table 3 summarizes the required amounts, with respect to the examples and comparative examples, of NMP above (relative to the standardized active material amount of 100 percent by weight) needed to create a battery.

TABLE 1

|  | Moisture generation amount (A) ppm | $CO_2$ generation amount (B) ppm | Specific surface area (C) $m^2/g$ | A/C | B/C |
|---|---|---|---|---|---|
| Example 1 | 1300 | 900 | 10.0 | 130 | 90 |
| Example 2 | 1470 | 1270 | 10.2 | 140 | 130 |
| Example 3 | 640 | 690 | 5.3 | 120 | 130 |
| Example 4 | 780 | 830 | 5.2 | 150 | 160 |
| Comparative example 1 | 3070 | 2430 | 9.6 | 320 | 250 |
| Comparative example 2 | 2230 | 2040 | 9.9 | 230 | 210 |
| Comparative example 3 | 1730 | 1800 | 5.2 | 330 | 350 |
| Comparative example 4 | 1550 | 1590 | 5.1 | 300 | 310 |

TABLE 2

|  | Moisture generation amount (A) ppm | $CO_2$ generation amount (B) ppm | Specific surface area (C) $m^2/g$ | A/C | B/C |
|---|---|---|---|---|---|
| Example 1 | 3400 | 4700 | 9.6 | 350 | 490 |
| Example 2 | 4350 | 5230 | 9.7 | 450 | 540 |
| Example 3 | 820 | 910 | 5.1 | 160 | 180 |
| Example 4 | 1220 | 2220 | 4.9 | 250 | 450 |
| Comparative example 1 | 18960 | 10970 | 9.3 | 2040 | 1180 |
| Comparative example 2 | 10010 | 9850 | 9.5 | 1050 | 1040 |
| Comparative example 3 | 5020 | 6280 | 5.0 | 1200 | 1260 |
| Comparative example 4 | 4830 | 4970 | 4.8 | 1010 | 1040 |

TABLE 3

|  | Moisture generation amount (A) ppm | Amount of NMP used NMP/active material (B) wt % | Specific surface area (C) $m^2/g$ | B/C |
|---|---|---|---|---|
| Example 1 | 1300 | 59 | 10.0 | 5.9 |
| Example 2 | 1470 | 68 | 10.2 | 6.7 |
| Example 3 | 640 | 35 | 5.3 | 6.6 |
| Example 4 | 780 | 40 | 5.2 | 7.7 |
| Comparative example 1 | 3070 | 93 | 9.6 | 9.7 |
| Comparative example 2 | 2230 | 123 | 9.9 | 12.4 |
| Comparative example 3 | 1730 | 58 | 5.2 | 11.2 |
| Comparative example 4 | 1550 | 63 | 5.1 | 12.4 |

Figure 2:
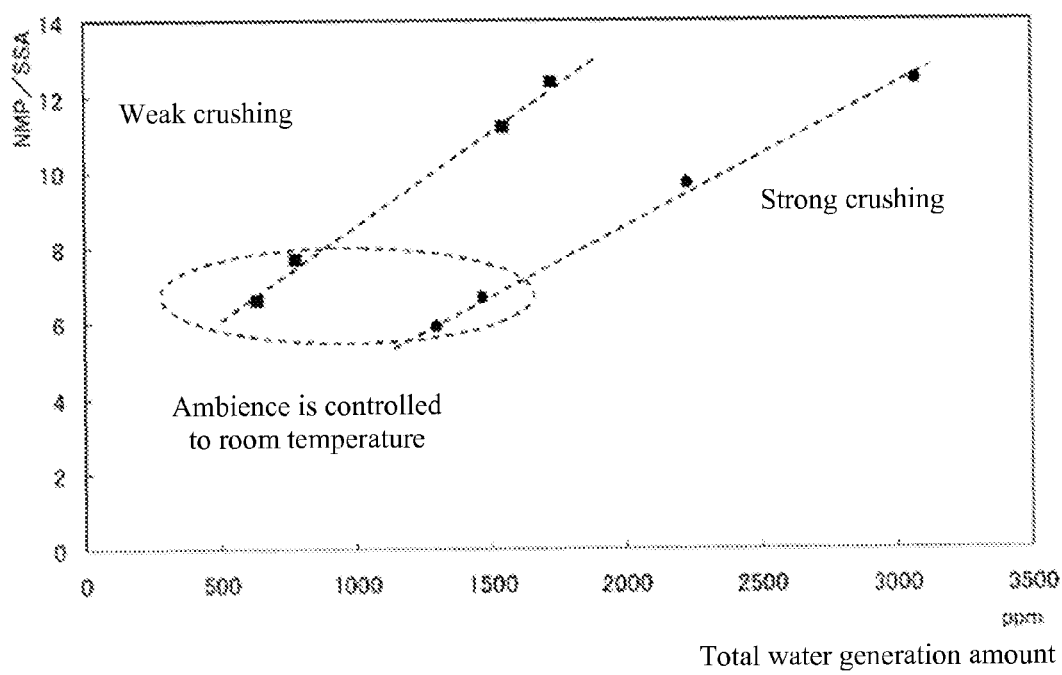
FIG. 2 is a graph showing the relationships of amount of water generation, required amount of solvent, and specific surface area, of examples and comparative examples.

As shown, an effect was confirmed that powders of low moisture generation amounts required less NMP. In general, the higher the specific surface area of the powder, the greater the amount of NMP becomes, which is needed to adjust to the specific viscosity. Accordingly, in the present invention the specified amount of NMP was divided by the specific surface area and the result was used in the evaluation. As a result, it was found that keeping the moisture generation amount low would control at a low level any increase in the required amount of NMP when the specific surface area was increased. FIG. 2 shows these findings in the form of a graph. In other words, the lithium-titanium complex oxide proposed by the present invention improves the value of specific surface area while suppressing gas adsorption, and also reduces the increase in the required amount of NMP, thereby improving the electrical characteristics of a lithium-ion secondary battery while maintaining high safety.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2012-138435, filed Jun. 20, 2012, the disclosure of which, including the claims, is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A lithium-titanium complex oxide, wherein a total water generation amount and total carbon dioxide generation amount measured by thermal decomposition gas chromatography mass spectrometry under heating from 60° C. to 900° C. at a rate of 20° C./min, are 1500 wt ppm or less and 2000 wt ppm or less, respectively.

2. A positive electrode for a battery containing the lithium-titanium complex oxide according to claim 1 as a positive electrode active material.

3. A negative electrode for a battery containing the lithium-titanium complex oxide according to claim 1 as a negative electrode active material.

4. A lithium ion secondary battery having a positive electrode containing the lithium-titanium complex oxide according to claim 1, or a negative electrode containing the lithium-titanium complex oxide according to claim 1.

5. A method of manufacturing the lithium-titanium complex oxide of claim 1, comprising:
    subjecting a mixture of titanium compound and lithium compound to a heat treatment at 600° C. or above, cooling the obtained reaction product to 50° C. or below, and then subjecting the cooled reaction product to a reheat treatment involving heating to the maximum temperature of 300 to 700° C. and then cooling; wherein a dew point of an ambience of the reheat treatment is controlled at −30° C. or below at a temperature of 200° C. or above.

* * * * *